United States Patent
Clausen et al.

(10) Patent No.: US 10,628,032 B2
(45) Date of Patent: *Apr. 21, 2020

(54) APPARATUS AND METHOD FOR APPLICATION PEEL

(71) Applicant: Samsung Electronics Co., Ltd., Suwon-si, Gyeonggi-do (KR)

(72) Inventors: William Stryker Clausen, Kirkland, WA (US); Ki Tae Kim, Bellevue, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,098

(22) Filed: Sep. 24, 2018

(65) Prior Publication Data

US 2019/0026020 A1    Jan. 24, 2019

Related U.S. Application Data

(63) Continuation of application No. 13/744,215, filed on Jan. 17, 2013, now Pat. No. 10,082,949.

(51) Int. Cl.
*G06F 3/0488* (2013.01)
*G06F 3/0483* (2013.01)

(52) U.S. Cl.
CPC ........ *G06F 3/04883* (2013.01); *G06F 3/0483* (2013.01)

(58) Field of Classification Search
None
See application file for complete search history.

(56) References Cited

U.S. PATENT DOCUMENTS

| | | | | |
|---|---|---|---|---|
| 6,016,144 A | * | 1/2000 | Blonstein | H04N 5/44543 348/553 |
| 9,292,199 B2 | * | 3/2016 | Choi | G06F 3/04883 |
| 2006/0284852 A1 | * | 12/2006 | Hofmeister | G06F 3/0483 345/173 |
| 2008/0001924 A1 | * | 1/2008 | de los Reyes | G06F 3/04886 345/173 |
| 2009/0119615 A1 | | 5/2009 | Huang | |
| 2009/0288032 A1 | * | 11/2009 | Chang | G06F 3/0483 715/776 |
| 2009/0327886 A1 | | 12/2009 | Whytock et al. | |
| 2010/0141605 A1 | * | 6/2010 | Kang | G06F 1/1626 345/174 |
| 2010/0299638 A1 | * | 11/2010 | Choi | G06F 3/04883 715/835 |

(Continued)

OTHER PUBLICATIONS

Office Action dated Dec. 11, 2018 in connection with European Patent Application No. 14 150 849.9, 6 pages.

(Continued)

*Primary Examiner* — Anil K Bhargava

(57) ABSTRACT

An apparatus and method for managing applications in a mobile device are provided. The method includes selecting a predetermined location within an active first application that is in a forefront state, and dragging the selected location to uncover an active second application. The first application is returned to the forefront by returning the selected location back to an original position thereof. The second application may be interacted with directly while the first application is in the dragged state.

20 Claims, 8 Drawing Sheets

(56) References Cited

U.S. PATENT DOCUMENTS

| | | | | |
|---|---|---|---|---|
| 2012/0159373 A1* | 6/2012 | Archer | .................... | G06F 3/048 |
| | | | | 715/776 |
| 2012/0180001 A1* | 7/2012 | Griffin | ................ | G06F 3/04883 |
| | | | | 715/863 |
| 2013/0021281 A1* | 1/2013 | Tse | ........................ | G06F 3/0425 |
| | | | | 345/173 |
| 2013/0325343 A1* | 12/2013 | Blumenberg | .......... | G01C 21/00 |
| | | | | 701/533 |
| 2013/0326384 A1* | 12/2013 | Moore | ............... | G01C 21/3638 |
| | | | | 715/771 |
| 2013/0326407 A1* | 12/2013 | van Os | .................. | G01C 21/00 |
| | | | | 715/810 |
| 2013/0328871 A1* | 12/2013 | Piemonte | ........... | G01C 21/3638 |
| | | | | 345/420 |
| 2014/0096049 A1* | 4/2014 | Vonshak | ................. | G06F 3/048 |
| | | | | 715/769 |
| 2014/0208248 A1* | 7/2014 | Davidson | .............. | G06F 3/0487 |
| | | | | 715/766 |

OTHER PUBLICATIONS

Extended European Search Report in connection with counterpart European Patent Application No. 19176029.7 dated Jan. 15, 2020, 11 pages.

* cited by examiner

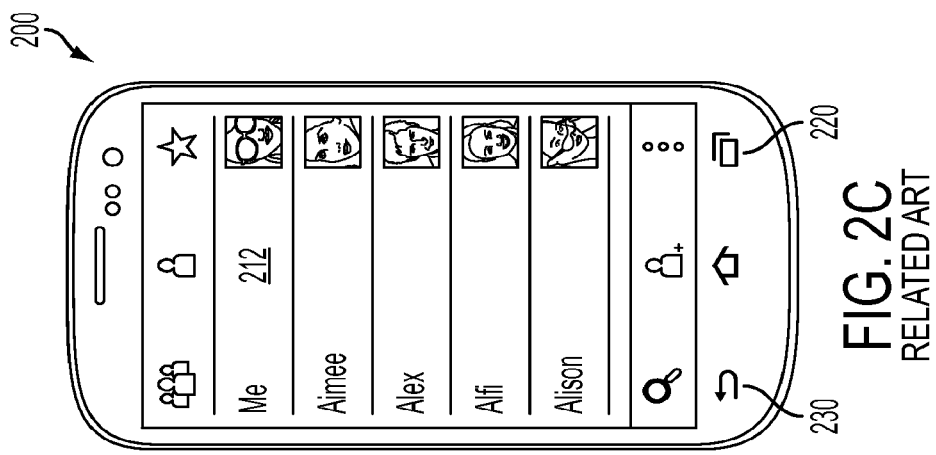
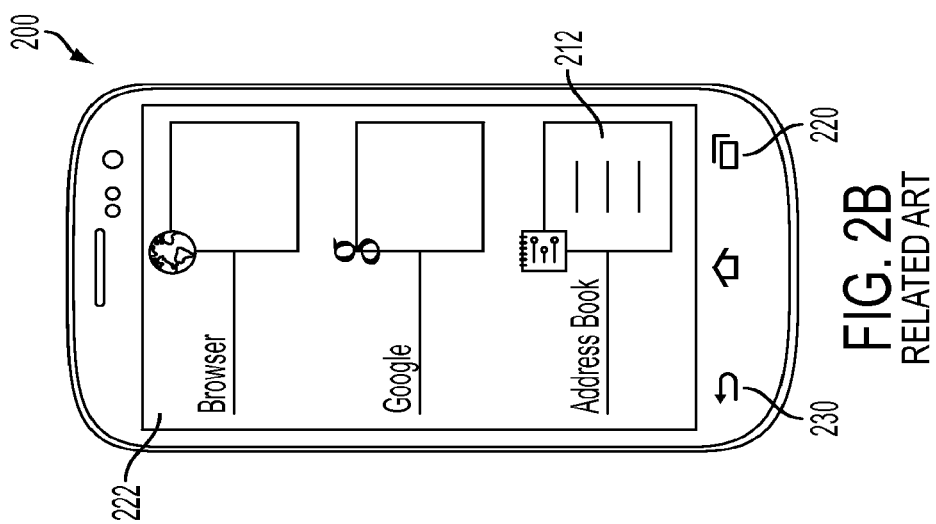
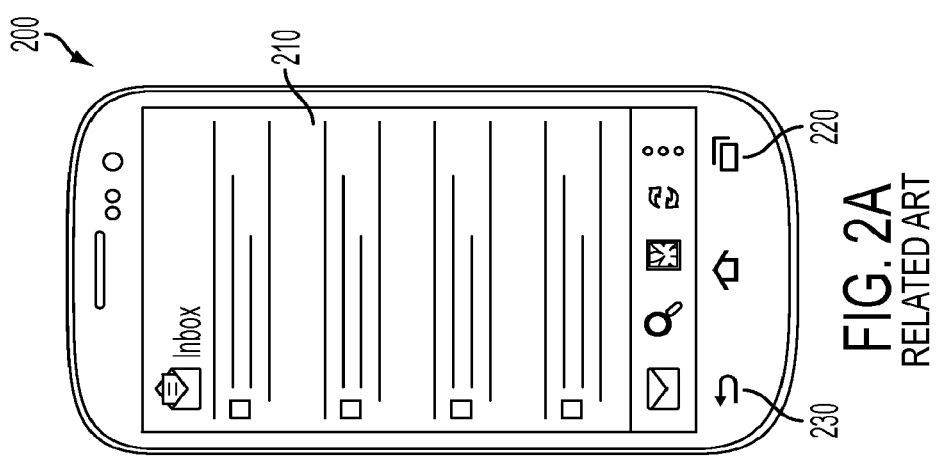

APPARATUS AND METHOD FOR APPLICATION PEEL

CROSS-REFERENCE TO RELATED APPLICATION

The present application is a continuation of U.S. patent application Ser. No. 13/744,215, filed Jan. 17, 2013, the contents of which are incorporated herein by reference.

BACKGROUND

1. Field

The present disclosure relates to an apparatus and method for managing applications in a computer device. More particularly, the present disclosure relates to an apparatus and method for managing a plurality of applications concurrently running in a desktop environment of a computer or comparable device.

2. Description of Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

One feature that has become more common recently in mobile terminals as well as in computers is a touch screen interface. For example, most smart phones and tablet computers now are provided with a touch screen interface. The touch screen functions as the display screen and also may function as an input device. For example, a user may select, open, grab and drag, adjust, etc. various applications and content via a touch to the corresponding icon or control displayed on the touch screen. The touch screen may be configured in various ways such as capacitive touch, stylus, etc.

FIG. 1 is a mobile terminal according to the related art.

Referring to FIG. 1, a tablet computer 100 is shown. The tablet computer 100 is essentially a portable display with a touch screen input function. The touch screen display will typically have a main screen including a desktop 110. The desktop may include icons 120 for various applications the user may wish to be able to launch quickly. The desktop 110 may also include a start menu 130 or similar function for the user to access applications and functions that do not have desktop icons provided.

Some Operating Systems (OSs) now allow a user to open and run multiple applications concurrently, even on a device where processing power and memory may be constrained, such as a smart phone. Other OSs may actively run only one application at a time, but may continue to run background processes for other applications.

An OS will usually be able to show the user a selection of recently used applications. However, it can be difficult for a user to switch between applications easily. For example, a user may be using an email application and select a link within an email to switch to a web browser and open the link. If the user wishes to refer back to the most recently used application, in this example switching back from the web browser to email, he may use a "back" button 140 to return to the previous application. However, many OSs have no corresponding "forward" button to resume the next application, in this example the web browser. Thus, if a user has finished with email and wishes to re-view the web page, he may return to the letter that had the link and re-select it, or may select a home button 150 to return to a home screen or a task manager screen 160 to select the web browser. An option to move directly forward to the next application is not available. The back button 140 may further be limited in that a back operation is separately defined for an application if the application was not invoked from another application; thus, if the user opens the web browser separately and selects the back button 140, he may return to a previously opened web site instead of the most recent previously used application, in this example email.

Similarly, if multiple applications are open or have been opened recently, the user may be forced to leave the screen of the current application to use an OS function such as the task manager listing all the open applications. The user may then select an opened application to bring it to the forefront so that he may see the contents. The user may need to refer back and forth, for example, between an email application, an address book, a web browser, a mobile banking application, etc., to determine or verify various information. There has not previously been available an easy and intuitive way to switch directly between the applications.

Accordingly, there is a need for an apparatus and method for providing an improved user interface for managing a plurality of applications. In particular, an improved and intuitive interface is needed for a touchscreen environment of a mobile device.

SUMMARY

Aspects of the present disclosure are to address at least the above-mentioned problems and/or disadvantages and to provide at least the advantages described below. Accordingly, an aspect of the present disclosure is to provide an apparatus and method for managing a plurality of applications.

In accordance with an aspect of the present disclosure, a method for managing applications in a mobile device is provided. The method includes selecting a predetermined location within an active first application that is in a forefront state, and dragging the selected location to uncover an active second application. The first application is returned to the forefront by returning the selected location back to an original position thereof. The second application may be interacted with directly while the first application is in the dragged state.

In accordance with another aspect of the present disclosure, a method of interacting with an application in a mobile device is provided. The method includes selecting a predetermined location of the application, dragging the predetermined location to peel the application, and performing a predetermined function according to the predetermined location.

In accordance with yet another aspect of the present disclosure, a method of interacting with an application in a mobile device is provided. The method includes partially peeling back the application, and touching and dragging along a peeled edge of the application to perform a predetermined function.

In accordance with still another aspect of the present disclosure, a mobile device is provided. The device includes a display for displaying one or more active applications, an input unit for receiving inputs, and at least one controller for controlling to select a location within a first application that is in a forefront state and to drag the selected location to uncover an active second application to the forefront state, to return the first application to the forefront by returning the selected location to an original position thereof, and to control input and output operations of the second application in the forefront state while the first application is in the dragged state.

In accordance with yet still another aspect of the present disclosure, a mobile device is provided. The device includes a display for displaying one or more active applications, an input unit for receiving inputs, and at least one controller for controlling to perform a predetermined function in response to a selection and drag of a predetermined location within an application that is in a forefront state. The predetermined function is according to the selected location.

In accordance with still yet another aspect of the present disclosure, a mobile device is provided. The device includes a display for displaying one or more active applications, an input unit for receiving inputs, and at least one controller for controlling to partially peel back an application that is in a forefront state, and to perform a predetermined function in response to a touch and drag along a peeled edge of the application.

Other aspects, advantages, and salient features of the present disclosure will become apparent to those skilled in the art from the following detailed description, which, taken in conjunction with the annexed drawings, discloses exemplary embodiments of the present disclosure.

BRIEF DESCRIPTION OF THE DRAWINGS

The above and other aspects, features, and advantages of certain exemplary embodiments of the present disclosure will be more apparent from the following description taken in conjunction with the accompanying drawings, in which:

FIGS. 2A-2C show the use of an application summary screen of a mobile device according to the related art;

Throughout the drawings, it should be noted that like reference numbers are used to depict the same or similar elements, features, and structures.

DETAILED DESCRIPTION

Figure 1:
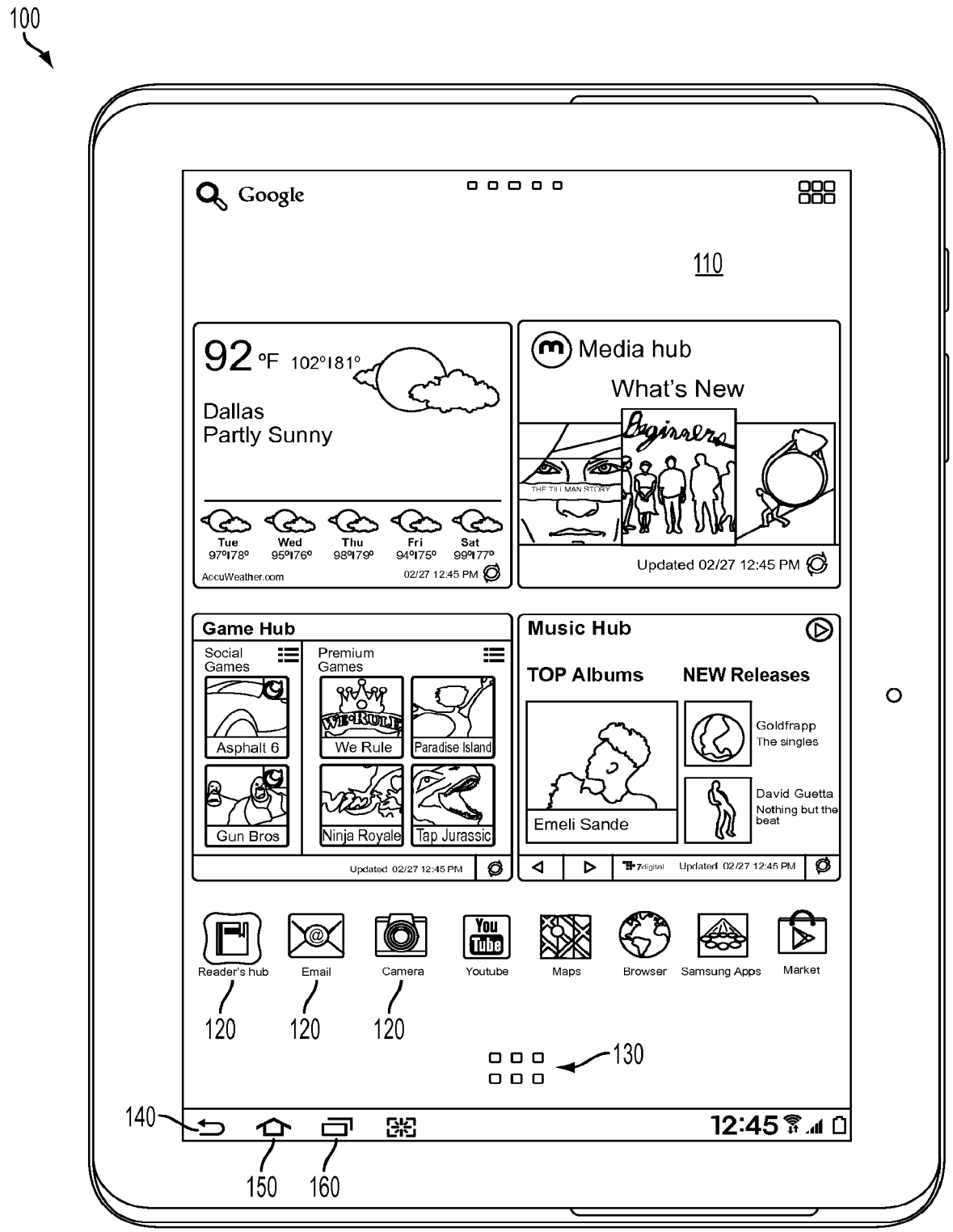
FIG. 1 is a portable terminal according to the related art.

The following description with reference to the accompanying drawings 1s provided to assist in a comprehensive understanding of exemplary embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of exemplary embodiments of the present disclosure are provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure include an apparatus and method for managing a plurality of applications concurrently running in a desktop environment of a computer or comparable device. In particular, the present disclosure may employ a method known herein as Application Peel.

FIGS. 2A-2C show the use of an application summary screen of a mobile device according to the related art.

Referring to FIG. 2A, an application, for example, an email application 210, is open on a mobile device 200 such as a smart phone. The Operating System (OS) of the mobile device 200 is capable of running multiple applications concurrently, but displays only one application "in focus" filling the screen at any time. This restriction is primarily due to the very limited screen size of mobile devices such as smart phones. It is assumed for this example that there are multiple applications running concurrently, but only one application 210 is open on the screen for the user to interact with.

By selecting an application list function 220 of the mobile device 200, an application management screen 222 is brought up as shown in FIG. 2B. The application management screen 222 shows a selection of concurrently running applications, e.g. address book 212. There may be more concurrently running applications not shown. In some OSs, only a visual image of a most recent state of recently used applications is shown in this screen. In the application management screen 222, a user may, for example, close an application, for example, by sliding it off screen. The user may scroll through the list of running applications by sliding the list, for example, along the long axis of the mobile device 200. The user may select an application, for example, address book 212, by tapping it. Selecting an application then brings the selected application to the forefront, as shown in FIG. 2C, and exits the application management screen.

Alternatively, the user could select the OS back button 230 to return to the application 210 which was previously in the forefront. If the user selects the OS back button 230 while in an application for which the back button 230 has no currently defined operation, the user will return to a home screen desktop.

Figure 3C:
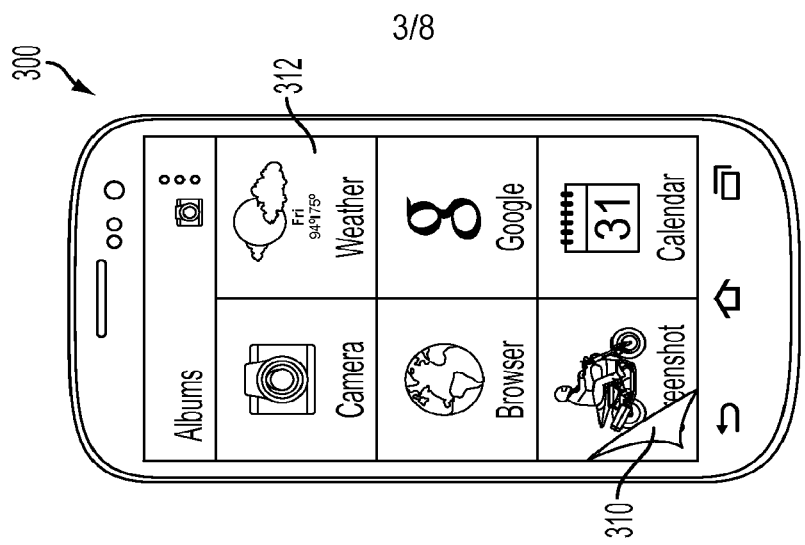
FIGS. 3A-3C show an exemplary embodiment of the present disclosure.
Figure 3B:
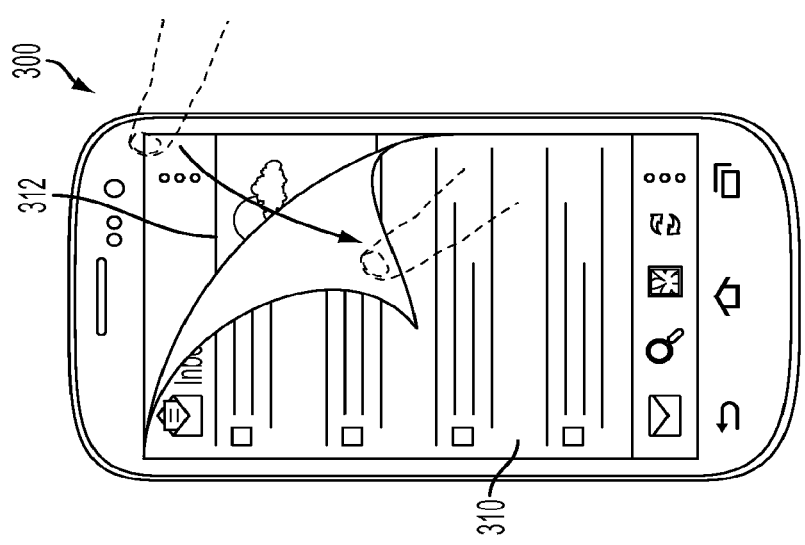
Figure 3A:
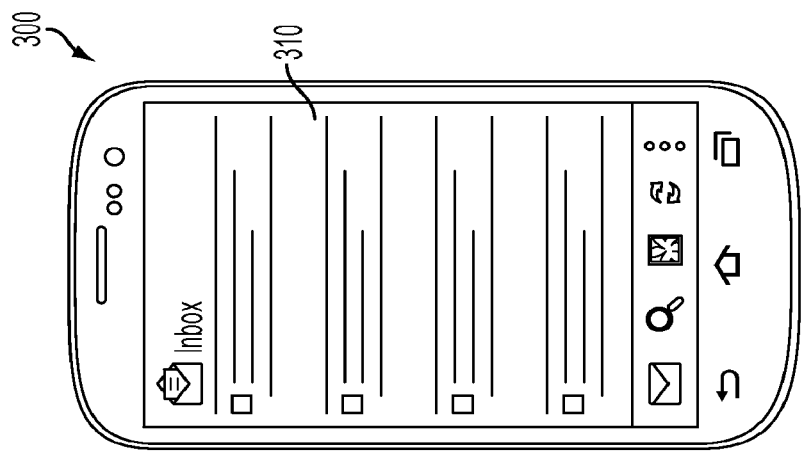

FIGS. 3A-3C show an exemplary embodiment of the present disclosure. More particularly, FIGS. 3A-3C illustrate an Application Peel interface according to an exemplary embodiment of the present disclosure.

Referring to FIG. 3A, a mobile device 300 is shown with an application 310 open and in the forefront. It is assumed for this example that multiple applications, e.g., applications 312 and 314, are running concurrently in the background, and thus not visible in FIG. 3A.

Referring to FIG. 3B, the user selects a predetermined area of the application 310. It is preferred that the predetermined area have no defined operation within the application. For example, the user may select a corner of the application where no button, menu, etc., is present for selection within the application. However, the present disclosure is not limited thereto. For example, a defined operation of an area of the application may be defined only for certain events, such as a single tap event on a button which is located, for example, in an upper right corner. The single tap on the button would thus have a predefined operation or function within the application, and no further evaluation of the event is necessary. In this example a different event, such as a touch and drag event, is not defined within the application for the button location. That is, if the button location is touched and dragged, the application will not have a corresponding operation or function. In that case, the application may not interpret the undefined event. The OS may then interpret the event that was undefined in the application, in this example, the touch-and-drag event on the button. A tap on the button thus is first determined to be a defined application function, but a touch drag on the button is not determined to be defined in the application, and therefore it is determined whether the OS has defined the event. If there is a conflict between an event defined in the OS and the same event defined in an application, the definition within the application will be correct; otherwise, the definition within the OS would effectively disable the valid application input. For example, if a game application in which objects may be selected and moved has an object in the upper right corner, a touch and drag event at the object should be interpreted as the input to the application.

The user then drags the selected area to peel the application across the desktop surface, as shown in FIG. 3B. The peeled application 310 reveals beneath it a most recently used other application 312. The peeling operation may be repeated to reveal additional applications. Each application revealed in this manner is in a currently running state. Application Peel may be configured such that the peeled application 310 remains in a peeled state until returned as shown in FIG. 3C. Alternatively, Application Peel may be configured such that an application may be completely peeled off by the user. Alternatively, Application Peel may be configured such that the peeled application 310, if released, returns automatically to the forefront, that is, unpeels. In this example, if the peeled application is released, it would return to the state of FIG. 3A. Alternatively, Application Peel may be configured such that the peeled application 310, if released, peels off completely if peeled more than a predetermined threshold and returns to the forefront if released when peeled less than the threshold. Thus, the user may consult concurrently running applications without going through an application management screen.

The peeled application may remain at least partially visible in the peeled state. The user may predetermine a level of transparency of the peeled application, or a level of transparency may be determined according to other factors, such as the extent to which the application has been peeled, a number of applications in a peeled state, a duration of the peeled state, a direction or position of the peeling, etc. For example, a user may peel an application from an upper right corner, and a degree of transparency of the peeled application may depend of the direction, such that peeling along the top edge is completely transparent, peeling down along the right edge is completely opaque, peeling diagonally towards the opposite corner renders the peeled application semi-transparent, etc.

The user may thus interact directly with the revealed application beneath the peeled application, and then unpeel the peeled application to return it to the forefront. However, the present disclosure is not limited thereto. For example, Application Peel may be configured to allow an application to be completely peeled.

The peeled application may indicate on its rear surface either an inversion of the front surface or another indication of what the peeled application is, so that the user may easily distinguish multiple peeled applications from each other. For example, an application that has been peeled a maximum amount to an opposite location on the screen should preferably be recognizable by the user in the peeled state. If the user has peeled multiple applications, he can thus easily unpeel to return to any peeled application he chooses.

In an exemplary embodiment of the present disclosure, any number of concurrently running or recently opened applications may be peeled in the above manner. If the user peels application 310 to reveal application 312 and sees that application 312 is not the application he was seeking, he may then peel application 312 to reveal another application beneath it, and so on.

If the user peels an application completely off the screen, the application is moved to the "bottom" of the layered applications. That is, the concurrently running applications are stored as a linked list. However, the present disclosure is not limited thereto. For example, an application peeled completely off the screen may be closed. Further, the above features may be combined. For example, peeling in different directions may be configured to perform different functions; an application peeled completely off the screen from right to left, for example, may be returned to the end of the linked list, and an application peeled completely off the screen in another direction, for example, left to right, may be closed thereby.

Application Peel may be configured such that peeling from different locations, for example, the top and bottom of the application, will cycle through the circular list of applications in corresponding opposite directions. Peeling in opposite directions to cycle through the applications in different directions results in an effect similar to a rolodex or carousel. If Application Peel is configured in this manner, it is preferred that the peeled and peelable applications be visible at least temporarily on opposite edges of the display.

The above features may be combined. For example, a first application might be peeled but not completely removed. A series of revealed second applications may then be completely removed, until a desired application is revealed. The user may interact normally with the desired application, and then unpeel the original application to return it to the forefront.

FIGS. 4A-4D illustrate an exemplary embodiment of the present disclosure.

Figure 4A:
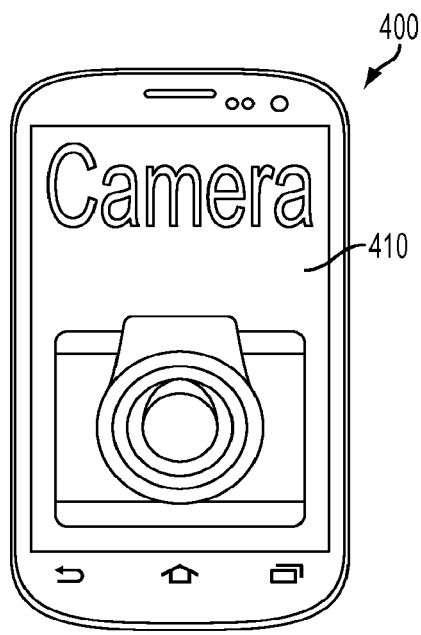
FIGS. 4A-4D illustrate an exemplary embodiment of the present disclosure.

Referring now to FIG. 4A, a device 400 is shown running multiple applications. An application 410 is active in the forefront.

Figure 4B:
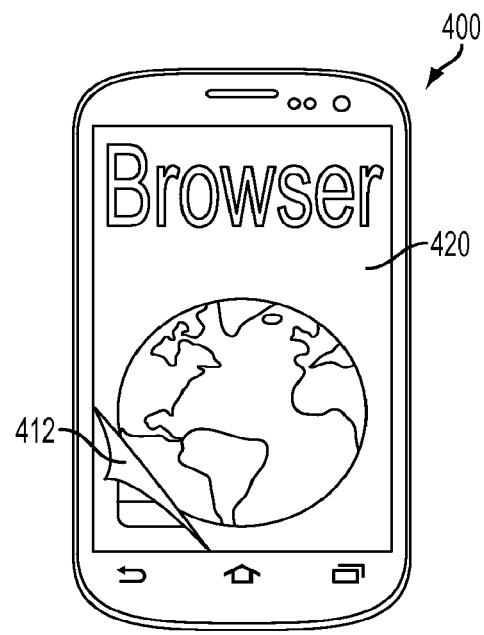

In FIG. 4B, the first application 410 has been peeled and is now peeled application 412. Peeled application 412 may be interacted with normally to the extent that it is visible, and may be unpeeled to fully return it to the forefront. A second application 420 is revealed by the peeling and may be interacted with normally to the extent that it is visible.

Figure 4C:
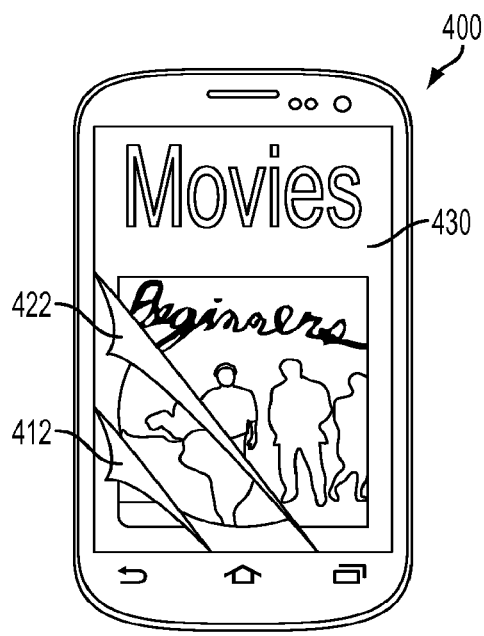

In FIG. 4C, the second application 420 has also been peeled, and is now peeled application 422. A third application 430 is revealed by the peeling and may be interacted with normally to the extent that it is visible. Peeled application 422 may be interacted with normally to the extent that it is visible, and may be unpeeled to fully return it to the forefront. In an exemplary embodiment of the present disclosure, peeled application 412 remains visible and may be unpeeled even with peeled application 422 after it. Any number of peeled applications may thus remain onscreen in a peeled state. However, the present disclosure is not limited thereto. For example, a number of peeled applications visible may be limited, such that if the limit is exceeded, a longest-peeled application may be peeled off the screen completely and returned to end of the list of active applications.

Figure 4D:
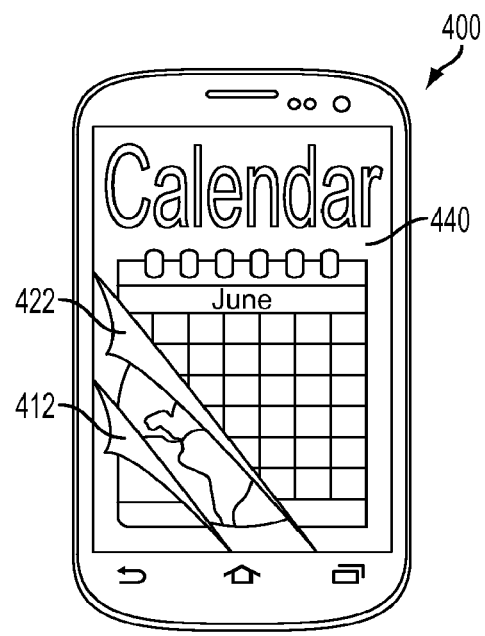

In FIG. 4D, a user has determined that the third application 430 was not desired, and so the third application 430 has been peeled completely off the screen, revealing a fourth application 440 which may be fully interacted with to the extent that it is visible. Peeled applications 412 and 422 remain visible and may be interacted with normally to the extent either is visible. Either of applications 412 and 422 may be unpeeled to return it to the forefront.

Application Peel may be configured such that any predetermined area of the application may be selected to begin peeling. It is preferred that the predetermined area be near an edge of the screen, but the present disclosure is not limited thereto. For example, Application Peel may be configured such that the user may select a side, a corner, a center, etc.

Figure 5:
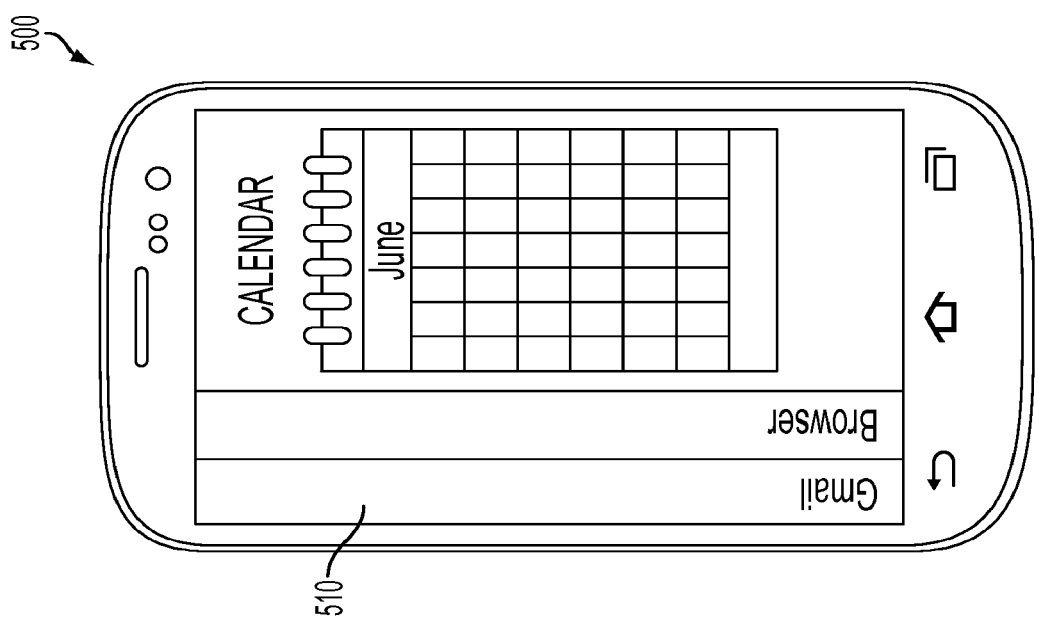
FIG. 5 shows an exemplary embodiment of the present disclosure.

FIG. 5 shows an exemplary embodiment of the present disclosure.

In an exemplary embodiment of the present disclosure, Application Peel is configured to display in the manner of a thin film or foil rolling back, but the present disclosure is not limited thereto. For example, Application Peel may be configured to have the forefront application shrink or distort in the pulled direction to uncover another application.

Referring now to FIG. 5, if the application is shrunk to a narrow vertical band 510 on the left or right side of a display of mobile device 500, for example, an effect can be achieved similar to a door being opened or a page being turned as the application is peeled from the forefront. Further, the change in size and shape can be varied to achieve different desirable effects to enhance the user's experience; for an example, Application Peel can be configured to have the vertical band 510 resemble a curtain that has been drawn aside. Other variations are of course possible.

Figure 6:
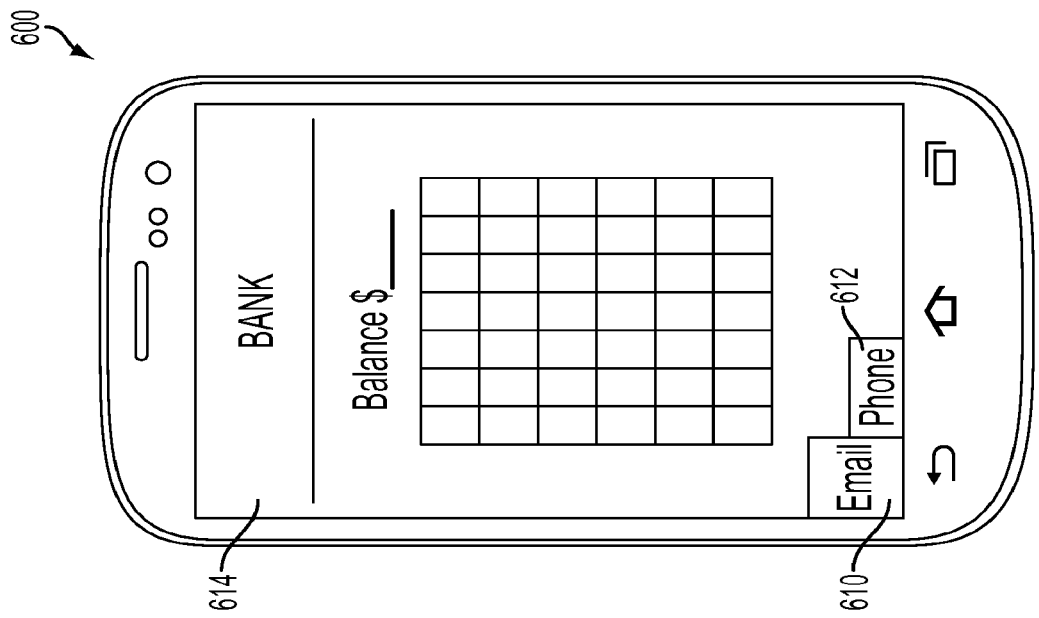
FIG. 6 shows an exemplary embodiment of the present disclosure.

FIG. 6 shows an exemplary embodiment of the present disclosure.

Referring now to FIG. 6, Application Peel may be configured to have the forefront application slide in the pulled direction in the manner of a tile displayed on a display of mobile device 600. In this exemplary embodiment, the tiled applications would maintain a size and shape, but would have some portion of the application shifted "off screen". It is preferred that each application slid aside in this manner maintain its order relative to the other applications. For example, if a first application 610 is slid to the bottom left, the bottom left of the screen would display the right top corner of the first application. If the next application 612 is similarly slid towards the bottom left, it would slide between the first application 610 and a third application 614. The bottom left corner of the screen would be the top right corner of the first application, protruding from the first application 610 would be the right top corner of the second application 612, and the remainder of the screen would be the third application 614. If the applications are slid to along an edge such as the top or side, Application Peel can be configured such that the third application 614 is entirely displayed in the remaining rectangular area. Alternatively, and in all cases, Application Peel can be configured such that the third application 614 is partially overlapped by the first and second applications. In each case, the user may then return to any peeled application by selecting the remaining visible portion of the earlier application and pulling it back to the screen.

Other variations are of course possible without departing from the scope and spirit of the disclosed disclosure, so long as the peeled application reveals a concurrently running application on the screen underneath, and can be unpeeled with a returning motion.

Figure 7C:
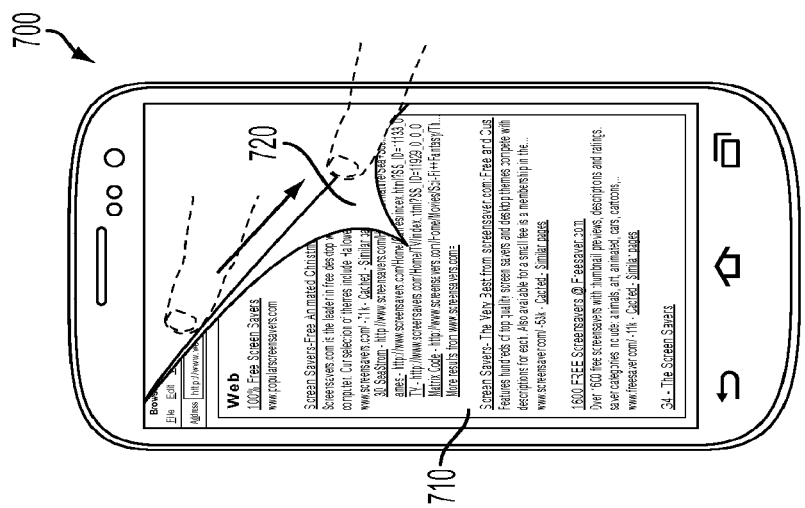
FIGS. 7A-7C illustrate an exemplary embodiment of the present disclosure.
Figure 7B:
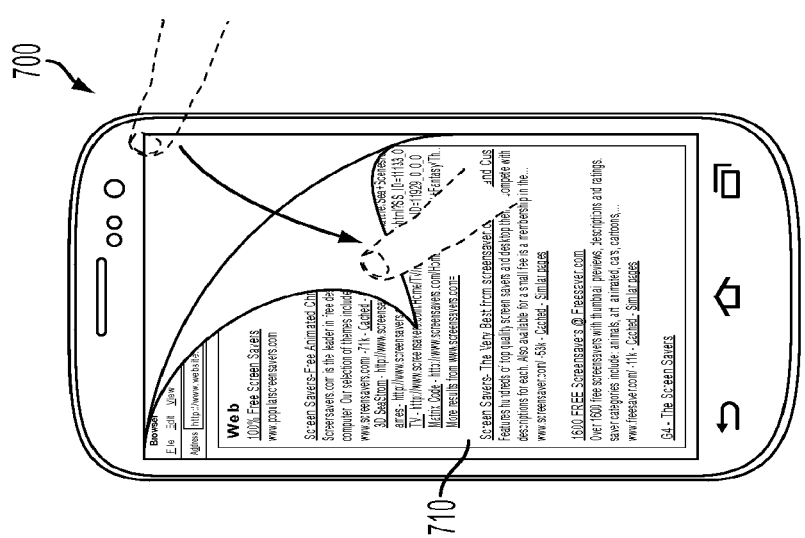
Figure 7A:
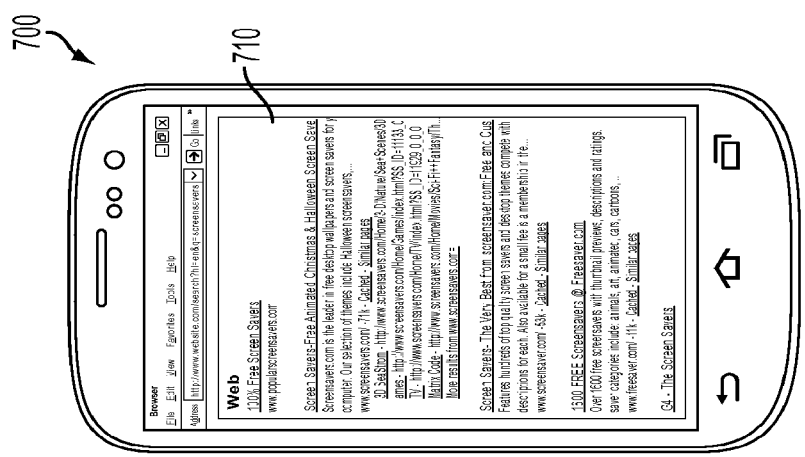

FIGS. 7A-7C illustrate an exemplary embodiment of the present disclosure.

Referring to FIG. 7A, a mobile device 700 is shown running an application 710, for example, a web browser.

In FIG. 7B, the user begins to peel the application as described above. In this example, it does not matter whether there are other concurrently running applications.

In FIG. 7C, the user runs a finger along the peel edge 720. This motion is intuitively comparable to folding or creasing the corner of a paper page, for example. In an exemplary embodiment of the present disclosure, creasing the peeled corner may have a predetermined effect. For example, in a web browser application 710, creasing the corner along edge 720 may save the present web page in a bookmarks list. If the creased corner is not defined for an application, the OS may have a default effect, for example, creating a link for the present application on the home desktop.

In an exemplary embodiment of the present disclosure, different creases may be defined to have different effects. For example, if the upper right corner of web browser 710 is creased along peeled edge 720, the current page may be saved as a bookmark. If the lower right corner is peeled and creased, a different effect may be defined, such as posting a link to the current page to the user's account on a social media site. The different effects of the various creased locations may be predetermined within each application, or may be determined according to a user's selection.

In an exemplary embodiment of the present disclosure, a predetermined area of applications may be defined to have a common effect. For example, peeling from a predetermined area of each application, for example, a top left corner, may be configured to bring up a help screen for a current application that has a help screen. The user may thus have a standard peel corner to remember to access the help screen for multiple applications. Similar to the crease function described above, each creased location not defined within an application may have a separately determined effect within the OS.

Figure 8:
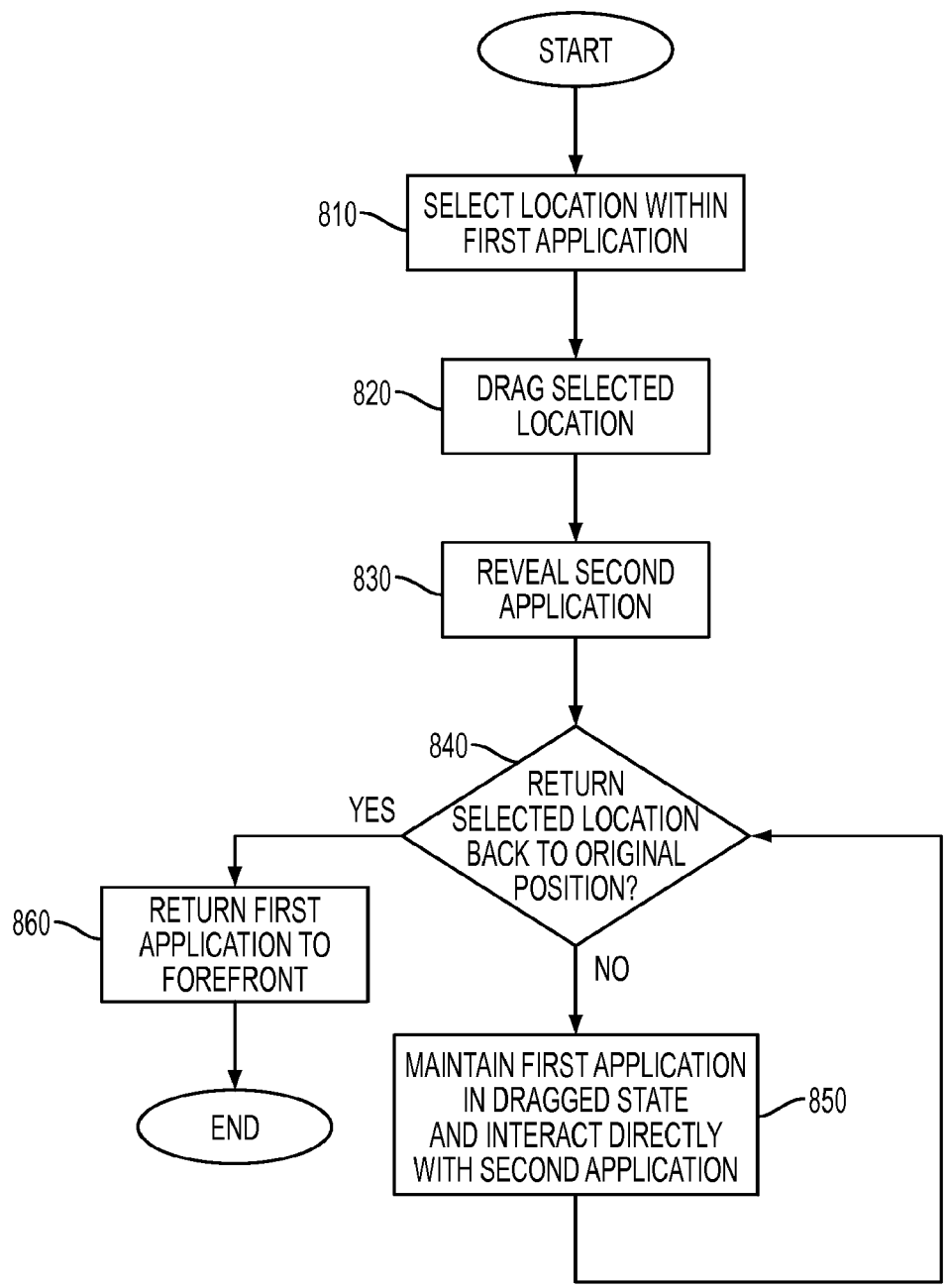
FIG. 8 is a flowchart of a method of an exemplary embodiment of the present disclosure.

FIG. 8 is a flowchart of a method of an exemplary embodiment of the present disclosure.

Referring to FIG. 8, in step 810 a location is selected within a first application. For example, a corner of the application may be selected by touching a corner of a touchscreen interface. The selected location is preferably a location that is not defined within the application for the touch event.

In step 820 the selected location is dragged. For example, in an exemplary embodiment, the dragged location may result in the corner of the application being peeled in the manner of a film or foil. In step 830, a second application will be revealed. The second application is an application that was concurrently running or recently selected. The second application will be revealed in a full screen state of current operation. The second application will be visible in the position where the location of the first application was selected and dragged. For example, if the corner of the first application is dragged towards the center of the screen, the second application will be uncovered and revealed in whatever area from which the first application has been dragged off. The user may interact normally with the revealed second application. In an exemplary embodiment, the first application will remain in the peeled state if released. Alternatively, in another exemplary embodiment, the first application will return to a full screen state if released.

In step 840 it is determined whether the selected location of the first application is returned back to its original position. In an exemplary embodiment, Application Peel can be configured to return the selected location to the original position if there is a touch-up (release) event. Alternatively, in another exemplary embodiment, the selected location may return to the original position only if dragged back to the original position by a user input such as a touch-and-drag event.

If it is determined that the selected location is not returned to its original position, the first application remains in the dragged state, for example, the selected location remains in a position to which it was dragged, in step 850. Additionally, the revealed second application is interacted with directly while the first location is maintained in the dragged or peeled state.

If it is determined that the selected location is returned to the original position, the first application is returned to the forefront in a full screen state in step 860.

Figure 9:
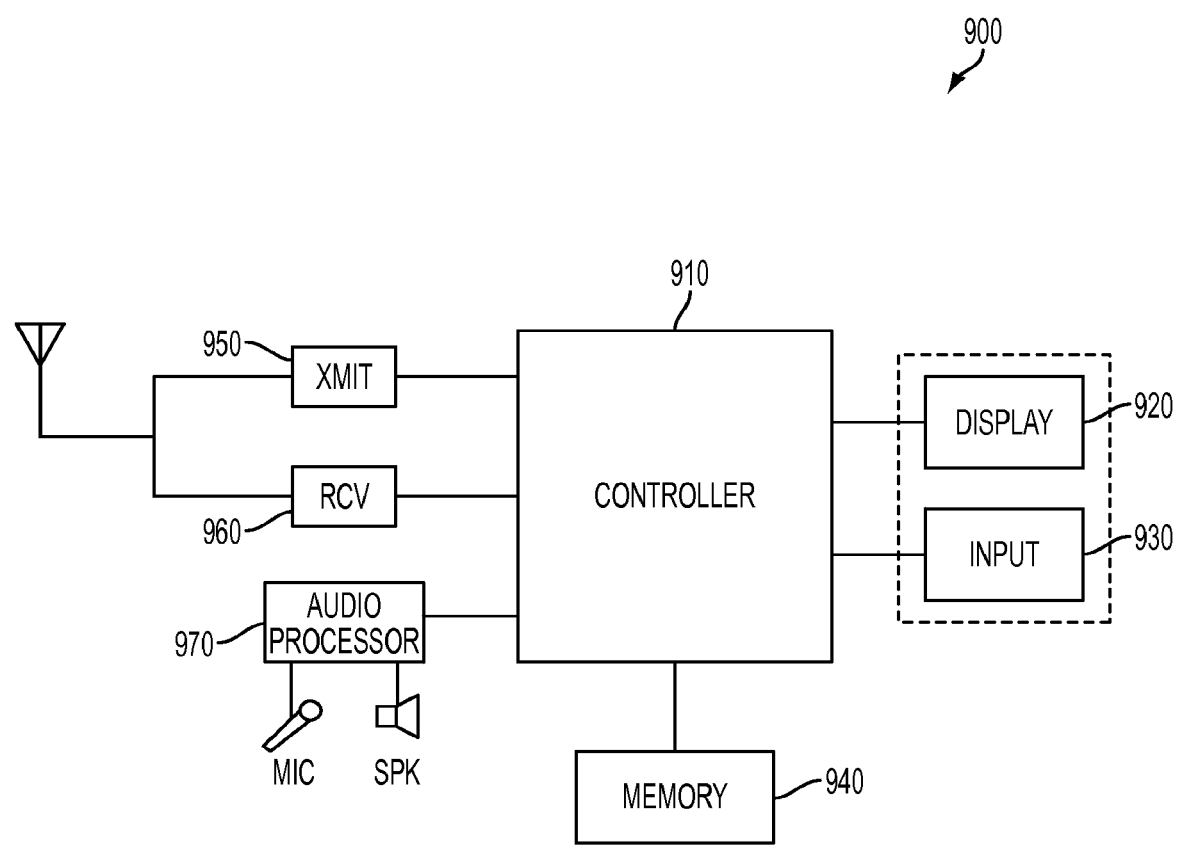
FIG. 9 is a block diagram of an apparatus according to an exemplary embodiment of the present disclosure.

FIG. 9 is a block diagram of an apparatus according to an exemplary embodiment of the present disclosure.

Referring to FIG. 9, a mobile device 900 according to an exemplary embodiment of the present disclosure includes at least one controller 910, a display 920 for displaying an active first application, and an input unit 930 for receiving inputs. In some embodiments, the display 920 and the input unit 930 may be combined as a touchscreen, although the present disclosure is not limited thereto.

The mobile device 900 may include a memory 940 for storing programs and data. The programs may include an OS and applications. If the memory 940 is present, it may include any form of memory that the controller 910 can read from or write to.

The mobile device 900 may include a transmitter 950 and a receiver 960 for wireless communication, such as a telephone function or a wireless internet function. The mobile device 900 may also include an audio processor 970, a microphone MIC, and a speaker SPK, for audio communication.

The mobile device 900 will include a function, either readable as a program from the memory 940 or embodied as hardware in the controller 910, to allow a user to select a location using the input unit 930 of an application displayed on display 920, and to drag the selected location to a different position, thereby revealing a second application. The second application will be revealed in an original position of the selected location of the first application. The revealed second application will be in a current running state and can be interacted with directly until the dragged location of the first application is returned to its original position.

Certain aspects of the present disclosure may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), Compact Disc (CD)-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents.

What is claimed is:

1. A method for managing applications in a mobile device, the method comprising:
   receiving an input on a location of a screen in which an active first application is displayed, wherein the active first application is in a forefront state;
   in response to detecting a drag of the input, at least partially uncovering an active second application;
   allowing for direct interaction with the active second application while the input is dragged; and
   returning the active first application to the forefront state in response to detecting the drag returning to the location of the screen,
   wherein the direct interaction is allowed on a portion of the active second application uncovered in response to detection of the drag of the input.

2. The method of claim 1, wherein the drag of the input is displayed as one of peeling a layer, sliding a tile, and shrinking the active first application, according to the drag.

3. The method of claim 2, further comprising, in response to the active first application being peeled, slid or shrunk completely off the screen, closing the active first application or moving the active first application to an end of a linked list.

4. The method of claim 1, wherein the active first application remains in a dragged state when released.

5. The method of claim 4, wherein:
   an active third application is revealed after the active second application is dragged, and
   return of a dragged application to an original position returns the dragged application to the forefront state.

6. The method of claim 5, wherein display of the screen is such that the active first application and the active second application are both visible and selectable after being dragged.

7. The method of claim 1, wherein the active first application automatically returns to the forefront state in an undragged state when released.

8. The method of claim 1, wherein the active first application is peeled completely off the screen and the active second application is in the forefront state.

9. The method of claim 8, wherein:
applications including the active first and second applications are displayed in a form of a linked list,
peeling an application completely off the screen moves the application to an end of the linked list, and
peeling all applications in the linked list completely off the screen reveals the active first application.

10. The method of claim 1, wherein applications including the active first and second applications are displayed in a form of a linked list and at least one of the applications is selected by clicking, sliding, or shrinking the linked list.

11. A mobile device comprising:
a display configured to display one or more active applications on a screen;
an input configured to receive inputs; and
a processor configured to:
receive an input on a location of the screen in which an active first application is displayed, wherein the active first application is in a forefront state,
in response to detection of a drag of the input, control the display to at least partially uncover an active second application,
allow for direct interaction with the active second application while the input is dragged, and
return the active first application to the forefront state in response to detection of the drag returning to the location of the screen,
wherein the direct interaction with the active second application is allowed on a portion of the active second application uncovered in response to detection of the drag of the input.

12. The mobile device of claim 11, wherein the drag of the input is displayed as one of peeling a layer, sliding a tile, and shrinking the active first application, according to the drag.

13. The mobile device of claim 12, wherein the processor is further configured to, in response to detection of the active first application being peeled, slid or shrunk completely off the screen, close the active first application or move the active first application to an end of a linked list.

14. The mobile device of claim 11, wherein the active first application remains in a dragged state when released.

15. The mobile device of claim 14, wherein:
an active third application is revealed after the active second application is dragged, and
return of a dragged application to an original position returns the dragged application to the forefront state.

16. The mobile device of claim 15, wherein display of the screen is such that the active first application and the active second application are both visible and selectable after being dragged.

17. The mobile device of claim 11, wherein the active first application automatically returns to the forefront state in an undragged state when released.

18. The mobile device of claim 11, wherein the active first application is peeled completely off the screen and the active second application is in the forefront state.

19. The mobile device of claim 18, wherein:
applications including the active first and second applications are displayed in a form of a linked list,
peeling an application completely off the screen moves the application to an end of the linked list, and
peeling all applications in the linked list completely off the screen reveals the active first application.

20. The mobile device of claim 11, wherein applications including the active first and second applications are displayed in a form of a linked list and at least one of the applications is selected by clicking, sliding, or shrinking the linked list.

* * * * *